Feb. 16, 1960  H. H. MAXIM  2,925,597
RADIO DIRECTION FINDER
Filed Oct. 25, 1955  2 Sheets-Sheet 1

INVENTOR.
HIRAM H. MAXIM
BY
Teller & McCormick
ATTORNEYS

Feb. 16, 1960     H. H. MAXIM     2,925,597
RADIO DIRECTION FINDER

Filed Oct. 25, 1955     2 Sheets-Sheet 2

INVENTOR.
HIRAM H. MAXIM
BY
Teller & McCormick
ATTORNEYS

United States Patent Office 2,925,597
Patented Feb. 16, 1960

2,925,597
RADIO DIRECTION FINDER

Hiram H. Maxim, Farmington, Conn., assignor, by mesne assignments, to Emhart Manufacturing Company, Hartford, Conn., a corporation of Delaware Application October 25, 1955, Serial No. 542,694

6 Claims. (Cl. 343—113)

This invention relates to a radio direction finder and, more particularly, to a direct reading radio direction finder which is portable and adapted for hand held operation.

It is the general object of the invention to provide a radio direction finder of the aforementioned type which includes in a unitary structure a radio receiver having a loop antenna and a magnetic compass remotely located with respect to the receiver and the antenna so as to avoid magnetic interference thereby, the said unitary structure being particularly adapted for hand held operation wtih the aforementioned elements arranged for convenient access and observation.

By way of background and to emphasize some of the advantages of the present invention, the disadvantages of conventional radio direction finder equipment will be considered. For example, in fixed installations aboard vessels or other craft, the loop antenna of a direction finding radio receiver is generally quite independent of the craft's magnetic compass and any other compass and is rotatable with respect to the fore and aft axis of the craft at some fixed location. The antenna is rotated by the operator to detect the "null" in signal reception from an identified transmitting station to which the receiver is tuned. Upon detecting the null, the operator must read and record its angular or rotated position and he must also read and record the magnetic heading of the craft. Then, the magnetic bearing to the transmitting station is calculated by adding the magnetic heading and the angle of rotation of the antenna. If the sum is in excess of 360°, the operator must subtract 360° from the sum to obtain the magnetic bearing. Under ideal conditions, the calculated magnetic bearing is quite accurate, but conditions are rarely ideal. That is, in most cases, the craft is so unsteady as to make it difficult to locate the null in a precise rotated position of the antenna and the unsteady craft causes inaccuracies in reading the magnetic heading. To reduce the error involved, it is customary to take readings in sets and to average the results for a more accurate calculated magnetic bearing on the transmitting station.

If a "fixed" is to be made, it is necessary to follow the same procedure with the receiver tuned to the signal of at least one additional identified transmitter. Obviously, the determination of a magnetic bearing to one transmitting station is time consuming and the determination of a fix is even more time consuming. It is also obvious that the error of the bearing and the error or inaccuracy of the fix increase with elapsed time.

There have been some radio direction finder constructions, including portable constructions, which have a magnetic compass for the radio receiver, the compass being rotatable with the loop antenna. In such constructions, calculation of magnetic bearing is eliminated, the bearing being read directly on the magnetic compass. However, so far as I am aware, there has never been provided a direct reading, hand held radio direction finder wherein the magnetic compass is so arranged as to be unaffected or substantially unaffected by the presence of the radio receiver and/or its loop antenna.

It will become apparent to those skilled in the art that in accordance with the present invention there is provided a direct reading, hand held radio direction finder which is so constructed and arranged that the magnetic compass is substantially unaffected by the radio receiver and/or its antenna.

In describing the invention and its aforesaid advantages, reference will be had to the accompanying drawings which, by way of preferred example only, illustrate a specific embodiment of the invention.

Figure 1:
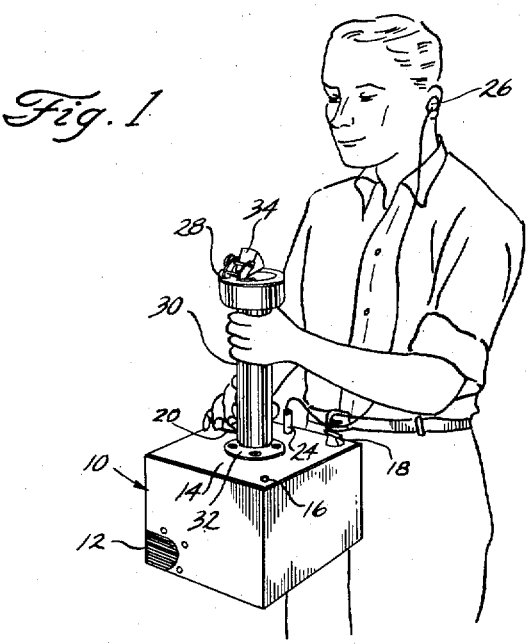
Fig. 1 is a view showing the manner in which the radio direction finder is held when in operation.
Figure 2:
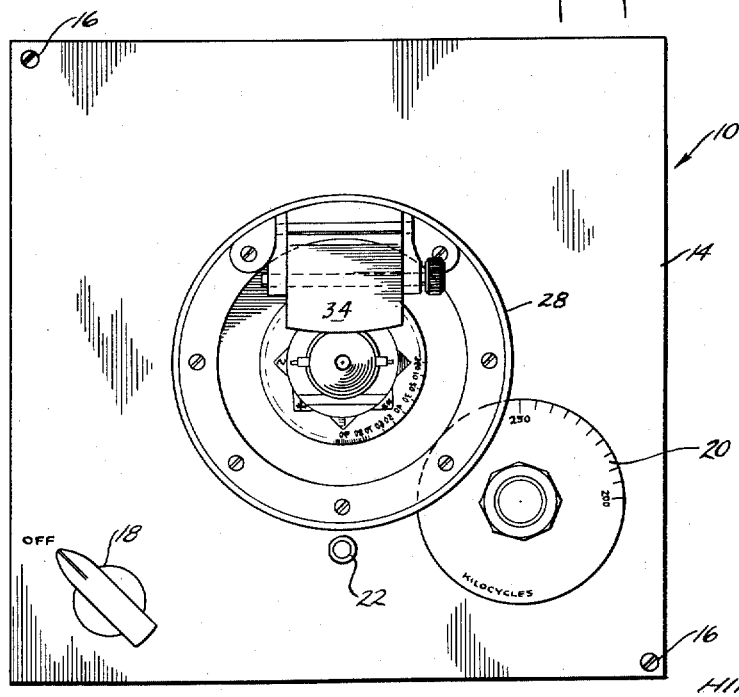
Fig. 2 is an enlarged top view of the radio direction finder.
Figure 3:
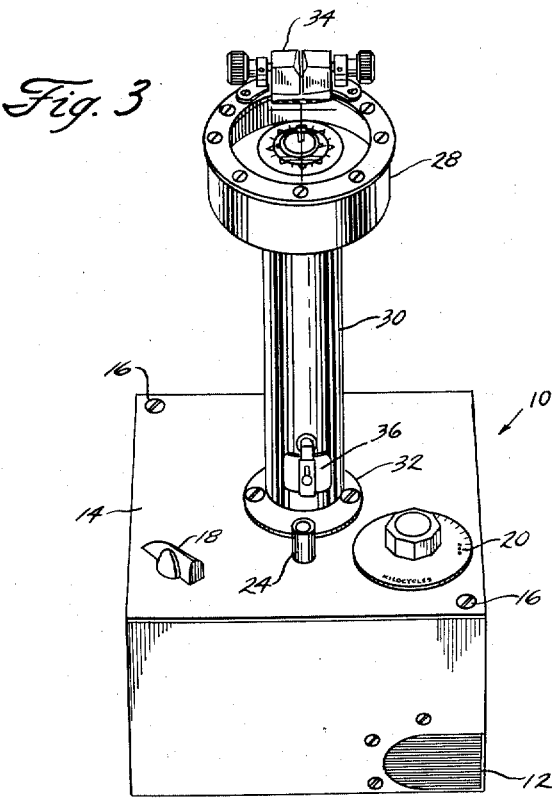
Fig. 3 is a perspective view thereof.

The essential components of the radio direction finder comprise a receiver, a direction sensitive antenna for the receiver, and a magnetic compass. As previously mentioned, it is an important feature of the invention that the aforesaid essential components are arranged in a unitary structure which is easy for an operator to hold and to operate. The presently preferred embodiment of the invention incorporating the aforesaid feature includes a generally rectangular case 10 wherein the receiver and the antenna are located. The case 10 is preferably constructed of lightweight non-magnetic material, such as aluminum, so that it will not disturb the magnetic compass or cause deviation thereof. The case 10 is provided with openings 12, 12 on its front and rear walls so as to avoid interference with a direction sensitive loop antenna (preferably ferrite) located within the case 10 adjacent the said openings. The loop antenna is so arranged within the case 10 that a signal from a transmitting station will be most strongly received when the sides of the case 10 are at the right angle to the line of transmission. The minimum signal or null will occur when the front and rear faces of the case are at a right angle to the line of transmission. The top of the case 10 is closed by a cover 14 detachably secured thereto as by screws 16, 16. While the receiver and antenna are of conventional construction, it is a feature of the present invention that the receiver controls are located on the said top cover 14. More specifically, a combined on-off switch and volume control 18 is located on the top cover adjacent the front left-hand corner thereof, and a tuning control 20 is located adjacent the right-hand front corner thereof. In addition to the foregoing, a jack socket 22 is provided in the top cover 14 to receive a jack 24 for a head set or for an ear piece 26 as shown in the drawings.

The magnetic compass 28 is supported at the upper end of a non-magnetic tube 30 which is secured at its lower end as indicated at 22 to the cover 14. The said tube 30 provides a case for the power supply batteries for the receiver. In addition to supporting the compass 28 and enclosing the receiver batteries, the tube 30 provides an elongated handle for an operator to grip so as to hold the unit as shown in Fig. 1.

When held in the aforesaid position, i.e., with the fron wall of the case adjacent the operator, the compass can easily be read through a prism 34 located on the rear side of the said compass and the said operator can also easily manipulate the volume control 18 and the tuning control 20 with his other hand. In this connection, it is important to observe that the sight line of the compass extends forwardly and rearwardly, the direction of minimum signal reception. Thus, an operator wearing a head set or an ear piece, such as indicated at 26, will support the unit before him such as shown in Fig. 1. When the operator has tuned the receiver to the signal of an identi fied transmitter, he can merely turn until the receiver signal diminishes to a null. When the null is located, the operator reads the compass 28 through the prism 34, the said reading being the magnetic bearing to the transmitting station. Reading of the compass may be facilitated by illumination, and to this end, an on-off button 36 is located on the tubular post 30 to switch on and off a light within the compass and adjacent the compass card, which light or lamp may be powered by the receiver battery or batteries.

I claim as my invention:

1. A portable radio direction finder comprising the combination of a case enclosing a radio receiver and a direction sensitive antenna therefor, an elongated handle extending from the case for the convenience of an operator to hold and turn the case whereby to locate by signal reception the direction of transmission from a remote transmitting station, and a compass supported on the extending end of the said handle for rotation with the case to indicate the bearing to the said transmitting station.

2. A portable radio direction finder comprising the combination of a non-magnetic case enclosing a radio receiver and a direction sensitive antenna therefor, an elongated non-magnetic handle extending vertically upwardly from the case for the convenience of an operator to hold and turn the case whereby to locate by signal reception the direction of transmission from a remote transmitting station, and a magnetic compass fixedly supported on the extending end of the said handle for rotation with the case to indicate the magnetic bearing to the said transmitting station.

3. A portable radio direction finder comprising the combination of a case enclosing a radio receiver and a direction sensitive antenna therefor, the said case having a cover whereon the receiver controls are located, an elongated handle extending vertically upwardly from the cover for the convenience of an operator to hold and turn the case whereby to locate by signal reception the direction of transmission from a remote transmitting station, and a compass fixedly supported on the extending end of the said handle for rotation with the case to indicate the bearing to the said transmitting station.

4. A portable radio direction finder comprising the combination of a non-magnetic case enclosing a radio receiver and a direction sensitive antenna therefor, a non-magnetic cover detachably secured to the case whereon the receiver controls are located, an elongated tubular non-magnetic handle secured to and extending vertically upwardly from the cover and enclosing the power supply battery for the receiver, the said handle being arranged for the convenience of an operator to hold and turn the case whereby to locate by signal reception the direction of transmission from a remote transmitting station, and a magnetic compass fixedly supported on the extending end of the said handle for rotation with the case to indicate the magnetic bearing to the said transmitting station.

5. A portable radio direction finder comprising in combination, a non-magnetic case having side walls and front and rear walls and enclosing a radio receiver and a direction sensitive loop antenna for the receiver which antenna is arranged within the case to receive a transmitted signal at maximum strength when the side walls are at a right angle to the line of transmission, means on the case for an operator to hold the same with its front wall adjacent the operator, means on the case rigidly supporting a magnetic compass in a remote position with respect to the receiver and antenna and with its sight line extending forwardly and rearwardly whereby in turning to a position of a null in signal reception, the operator can determine by the compass reading the magnetic bearing to a transmitting station.

6. A portable radio direction finder comprising in combination, a non-magnetic case having side walls and front and rear walls and enclosing a radio receiver and a direction sensitive loop antenna for the receiver which antenna is arranged within the case to receive a transmitted signal at maximum strength when the side walls are at a right angle to the line of transmission, a non-magnetic elongated handle extending vertically upwardly from the case for the convenience of an operator to hold the case with its front wall adjacent the operator, and a magnetic compass fixedly supported on the extending end of the handle with its sight line extending forwardly and rearwardly whereby in turning to a position of a null in signal reception, the operator can determine by the compass reading the magnetic bearing to a transmitting station.

References Cited in the file of this patent

UNITED STATES PATENTS

| 299,968 | Torre | June 10, 1884 |
| 1,051,543 | Blake | Jan. 28, 1913 |
| 1,637,615 | Kolster | Aug. 2, 1927 |
| 2,475,975 | McCarthy et al. | July 12, 1949 |
| 2,535,053 | Ercolino | Dec. 26, 1950 |